(12) United States Patent
Sasatani et al.

(10) Patent No.: US 7,925,491 B2
(45) Date of Patent: Apr. 12, 2011

(54) SIMULATION OF INSTALLATION AND CONFIGURATION OF DISTRIBUTED SOFTWARE

(75) Inventors: Yohkichi Sasatani, Kanagawa (JP); Kazuhito Akiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/771,115

(22) Filed: Jun. 29, 2007

(65) Prior Publication Data
US 2009/0006070 A1    Jan. 1, 2009

(51) Int. Cl.
G06F 9/45 (2006.01)
(52) U.S. Cl. .......................................... 703/22; 717/174
(58) Field of Classification Search ...................... 703/22
See application file for complete search history.

(56) References Cited

U.S. PATENT DOCUMENTS

| | | | | |
|---|---|---|---|---|
| 5,457,797 | A * | 10/1995 | Butterworth et al. | 719/320 |
| 6,938,027 | B1 * | 8/2005 | Barritz et al. | 706/50 |
| 6,983,449 | B2 * | 1/2006 | Newman | 717/121 |
| 7,035,930 | B2 * | 4/2006 | Graupner et al. | 709/226 |
| 7,093,113 | B2 * | 8/2006 | Lakshman | 713/1 |
| 7,665,085 | B2 * | 2/2010 | Sundararajan et al. | 717/174 |
| 2004/0128651 | A1 * | 7/2004 | Lau | 717/124 |
| 2006/0161883 | A1 * | 7/2006 | Lubrecht et al. | 717/104 |
| 2008/0270104 | A1 * | 10/2008 | Stratton et al. | 703/23 |

FOREIGN PATENT DOCUMENTS

| | | |
|---|---|---|
| JP | 10-187428 A | 7/1998 |
| JP | 2000-216780 A | 8/2000 |
| JP | 2006-011860 A | 1/2006 |
| JP | 2006-099307 A | 4/2006 |

OTHER PUBLICATIONS

Eliam et al, "Managing the Configuration Complexity of Distributed Applications in Internet Data Centers", IEEE Communications Magazine, Mar. 2006, pp. 166-177.*
Mikic-Rakic et al, "Architecture-Level Support for Software Component Deployment in Resource Constrained Environments", Lecture Notes on Computer Science, Component Deployment, vol. 2370/2002, pp. 493-502, 2002.*
TeamQuest, "Capacity Planning, Discipline for Data Center Decisions", TQ-EB01-RevA, 2004.*

* cited by examiner

*Primary Examiner* — Mary C Jacob
(74) *Attorney, Agent, or Firm* — Lieberman & Brandsdorfer, LLC

(57) ABSTRACT

Method and framework for identifying optimal allocations of computing resources in a complex, distributed data processing environment. A plurality of server models are established, with each server model including one or more server nodes and each server node having an associated set of capacity attributes. Similarly, a plurality of service models are established, each service model including one or more service nodes and each service node having an associated set of demand attributes. The server models are defined with a layered relationship as are the service models. A node that is part of a model in one layer corresponds to a model in the next-lower layer. The invention generates optimized mappings of service nodes that are described in user-selected service models to server nodes that are described in user-selected server models, as a function of the associated sets of demand and capacity attributes.

19 Claims, 7 Drawing Sheets

FIG. 9

Request for Change

| Target | Item | Change |
|---|---|---|
| Computer D | Add Database Space | 15 GB |
| Firewall A | Open Port | Between Computer C and D: 50000<br>Between Computer C and D: 50001 |

Preview Installation and Configuration

Required Changes

| | | |
|---|---|---|
| Computer A | Add Memory | 256MB |
| Computer D | Add DB Space | 15GB |
| Firewall A | Open Port | C-D:50000/50001 |

Compare Installation and Configuration

| Computer D- Current | | Computer D- After | |
|---|---|---|---|
| CPU | 80% | CPU | 50% |
| Memory | 1GB | Memory | 800MB |
| Storage | 100GB | Storage | 80GB |
| DB Space | 5GB | DB Space | -15GB |

1002, 1004, 1006, 1008, 1010, 1020, 1022, 1024, 1000

SIMULATION OF INSTALLATION AND CONFIGURATION OF DISTRIBUTED SOFTWARE

BACKGROUND OF THE INVENTION

1. Technical Field

This invention relates to a method and system for installation and configuration of distributed software in a computer system. More specifically, the invention relates to employing correlation information in a configuration management database to facilitate selection and installation of distributed software.

2. Description of the Prior Art

A configuration management database (CMDB) is a repository of information related to all the components of an information system. Although repositories similar to CMDBs have been used by information technology (IT) departments for many years, the term CMDB stems from information technology infrastructure library (ITIL), which is a framework of best practice approaches intended to facilitate the delivery of high quality information technology services. In the ITIL context, a CMDB represents the authorized configuration of the significant components of the IT environment. A CMDB helps an organization understand the relationships between these components and track their configuration. The CMDB is a fundamental component of the ITIL framework's configuration management process. CMDB implementations often involve the insertion of data into the CMDB from other sources in such a way that the source of the data retains control of the data.

The CMDB records configuration items (CIs) and details about the important attributes and relationships between CIs. Configuration managers usually describe CIs using three configurable attributes: technical, ownership, and relationship. The CMDB is integral to configuration management. It enables the consistent, accurate, and cost-effective identification, control, status accounting, and verification of all CIs in the CMDB. The CMDB provides accurate information about hardware, software, and current configuration that enables automated software releases, as well as back-out procedures and project scheduling.

When two systems are merged into a new system, it is necessary to conduct a preliminary survey to analyze the hardware and software components for each application to determine their location and role in the new system prior to installation of the applications in the merged systems. In addition, it is necessary to determine whether additional hardware or software will be necessary to maintain performance of the system after installation. To determine the most optimized installation and configuration for complex distributed software, it is necessary to investigate how many possible options exist and to compare these options in order to estimate the result of installation and configuration.

Conventionally, a method is provided to automatically select the system in which software is installed. Japanese Abstract JP 2006-99307 to Soichi et al. is an example of a method of selecting software for installation whereby the installation is based on the dependencies between software components. Other prior art examples includes, Japanese Abstract JP2006-11860 to Akira et al. which provides a function to properly judge the kind of resources lacking according to the operation condition of the system and to dynamically configure those resources, and Japanese Abstract JP 2006-216780 to Makoto et al., whereby a function is employed to detect and execute the configuration changes of a firewall tunneling based on the network configuration of the current network device. However, these prior art solutions do not address the need for a system to simulate one or more configuration options prior to implementing a system modification or component installation. By employing a simulator prior to altering the system configuration and/or deployment of new components, it may be ascertained whether such a deployment will improve system performance.

Therefore, there is a need for a solution that employs a simulator tool to provide detailed information about the implications of installation of a component or modification of a system prior to the installation or modification thereof. Such a tool should mitigate costs associated with implementing modifications to a system if it can be determined if the proposed modification will not provide the anticipated or desired system configuration and/or improvement.

SUMMARY OF THE INVENTION

This invention comprises a method and system to simulate changes to a system associated with a hardware and/or software installation.

In one aspect of the invention, a method is provided for installation of distributed software. Installation of a new software application is requested in a computer system configured with a CMDB to store hardware and software resource data. Configuration and correlation information for hardware and software stored in the CMDB is searched in response to the request and prior to installing the new software application. Affects of installation of the requested software application on the hardware and software resources in the computer system are simulated. The simulation applies the hardware and software resource data stored in the CMDB to the simulation.

In another aspect of the invention, an apparatus is provided for a computer system having a processor in communication with storage media. The storage media has a CMDB to store hardware and software resource data. An installation manager is provided to request installation of a new software application in the computer system configured with the CMDB. In response to the request for installation of the new software application and prior to installation of the new software application, the installation manager searches for configuration and correlation information for hardware and software stored in the CMDB. A simulator simulates affects of installation of the requested software application on associated hardware and software resources in the computer system. In one embodiment, the simulator applies the hardware and software resource data stored in the CMDB to the simulator.

In yet another aspect of the invention, an article is provided with a computer readable carrier including computer program instructions configured to install distributed software. Instructions are provided to request installation of a new software application in a computer system configured with a CMDB to store hardware and software resource data. Instructions are provided to search for configuration and correlation information for hardware and software stored in the CMDB in response to the request and prior to installing the new software application. In addition, instructions are provided to simulate affects of installation of the requested software application on the hardware and software resources in the computer system, including applying the hardware and software resource data stored in the CMDB to the simulation.

Other features and advantages of this invention will become apparent from the following detailed description of the presently preferred embodiment of the invention, taken in conjunction with the accompanying drawings.

BRIEF DESCRIPTION OF THE DRAWINGS

FIG. 9 is a block diagram of an example chart showing the requested changes to the hardware configuration so that the hardware may support the software installation.

FIG. 10 is a block diagram showing an example of the visual display.

DESCRIPTION OF THE PREFERRED EMBODIMENT

Technical Details

Figure 1:
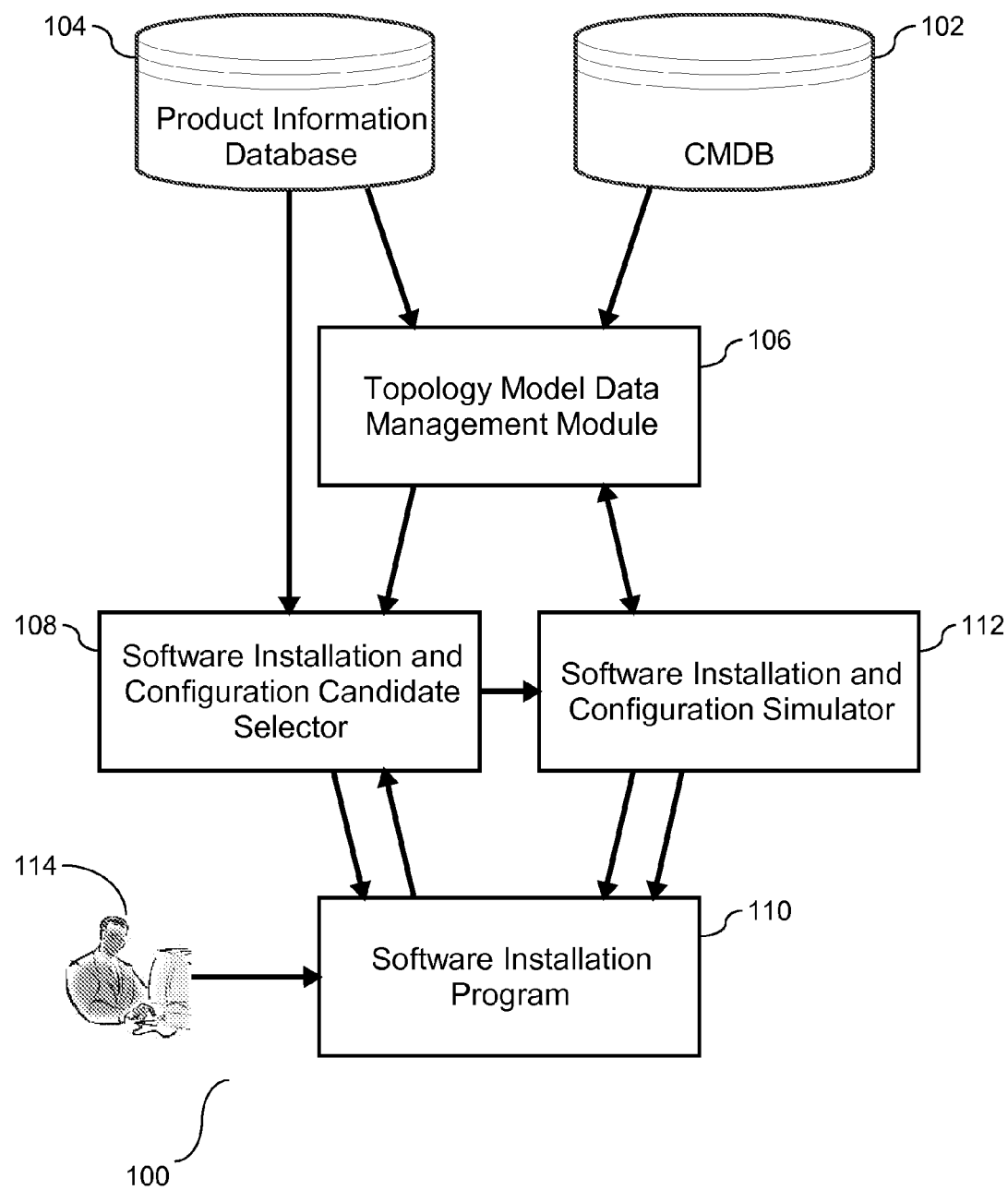
FIG. 1 is a block diagram of the components utilized in a simulation of a software installation.

FIG. 1 is a block diagram (100) of the components utilized in a simulation of a software installation. Among the components, there are two databases. One database is the CMDB (102), which is a database that preserves software and hardware configuration information. This database preserves static information, such as software and hardware versions, and also includes information about which application is operating and in which database the data is stored. In addition, the CMDB (102) stores statistical data, such as central processing unit (CPU) usage rate, memory usage, etc. The second database is the product information database (104), which is a database in which product information for each component of the system is preserved. Both the CMDB (102) and the product information database (104) are in communication with a topology model data management model (106) which facilitates management of the physical topology of the elements in the associated computer system. In addition, as shown both the product information database (104) and the topology model data management model (106) are in communication with a software installation and configuration candidate selector (108). The selector (108) is a tool that communicates software that may be selected for installation in the computer system. As shown, the selector (108) is in communication with the software installation program (110) which receives input from a user (114). Once the user (114) has selected a software module as a candidate for installation, the selector (108) communicates this selection to the simulator (112) which provides information about the impact the software installation may have on the existing system. The simulator (112) is in communication with the topology manager (106) as well as the software installation program (110).

The simulator (112) is in communication with the user (114) to facilitate software selection and system configuration of the selected software.

Figure 2:
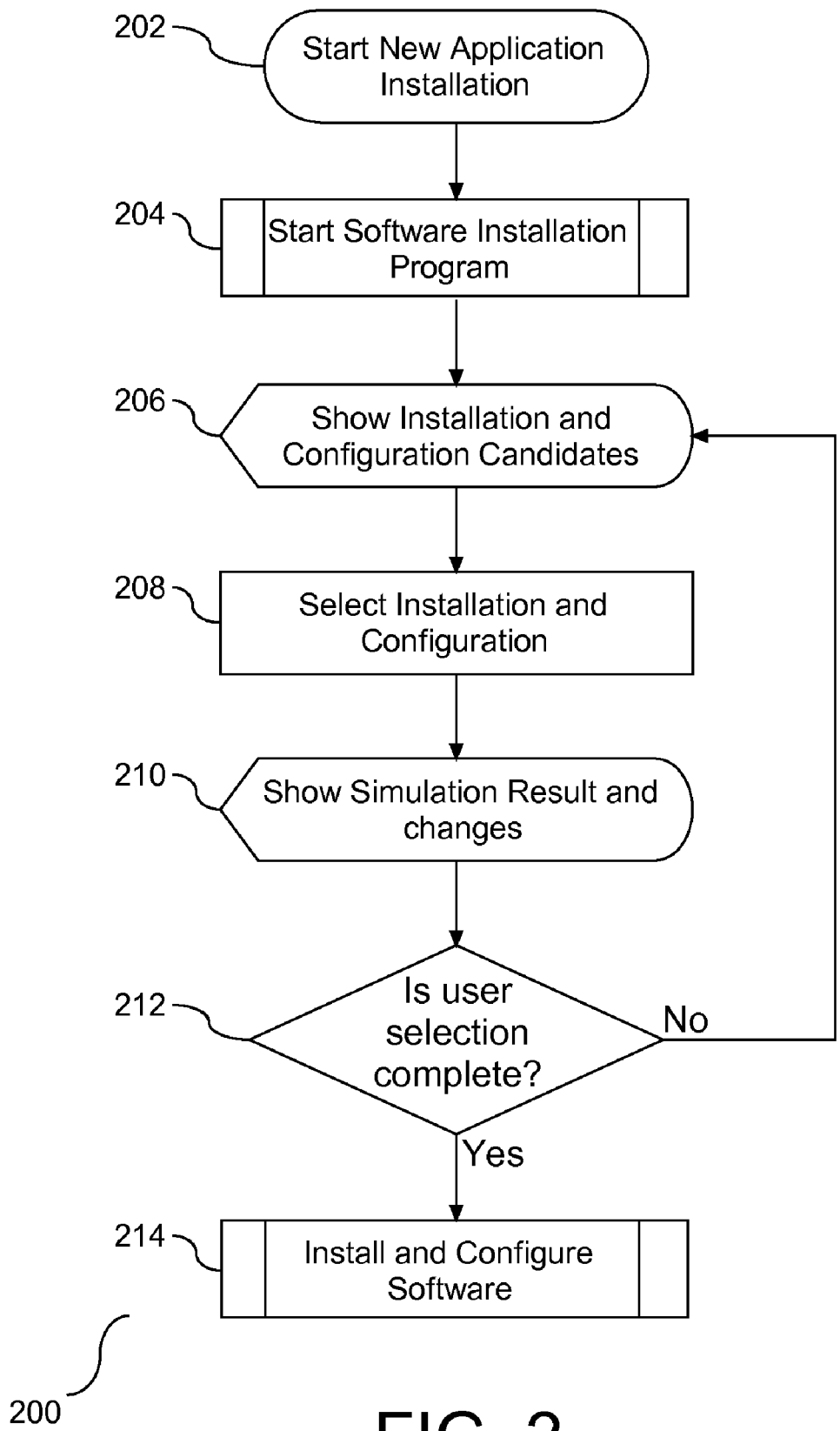
FIG. 2 is a flow chart illustrating the general process for installation of a new software application according to the preferred embodiment of this invention, and is suggested for printing on the first page of the issued patent.
Figure 3:
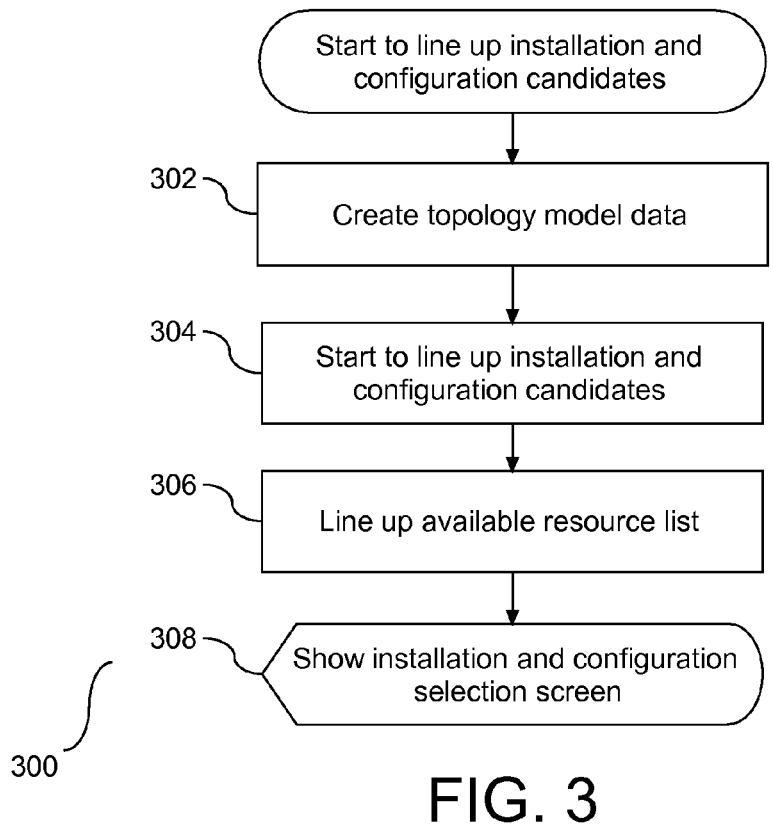
FIG. 3 is a flow chart demonstrating a process for showing the installation and configuration of system candidates.

FIG. 2 is a flow chart (200) illustrating the general process for installation of a new software application while employing the simulator tool to facilitates the installation process and integration of the new software application to an existing computer system. Whether there is a single software component or multiple software components designated to be installed, any installation has the possibility of affecting other components in the computer system. Initially, one or more new software applications are designated to be installed in an existing computer system (202). An installation program is started to facilitate the installation process (204). The installation program shows the installation and configuration candidates available for selection (206) to enable the user to preview the installation process. There are two steps in the process of showing the installation and configuration candidates. The first step is the selection process, i.e. the process of selecting software application to be simulated. The second step is the act of previewing the selected application through the simulation. For the selection process, the software installation and configuration candidate selector (108) is employed together with the topology model data management model (106). As noted above, product information for each component of the system is provided to both the candidate selector (108) and the topology management model (108) by the product information database (104). Similarly, the topology management model (108) receives data from both the product information database (104) and the CMDB (102). FIG. 3 is a flow chart that itemizes the action at step (206) in detail.

Once the candidates available for selection have been designated, the user may select one or more candidates for installation as well as modifications to the system configuration to accept the installation (208). Each proposed modification and/or prior modification will affect system performance and operation. A simulation of the resulting system and system configuration are provided to the user (210) via the simulator (114). Following step (210), it is determined whether the user of the simulator has finished selecting applications for installation to be previewed by the simulator (212). The user may be prepared to proceed with implementing the configuration presented in the simulation, or may want to present other modifications on the simulator in view of the changes presented at step (210). If it is determined at step (212) that the user has not completed the modification simulation, the process returns to step (206) for further selection of other software modifications to be evaluated and presented to the user by the simulator. However, if it is determined that the user has completed the component selection process, the selected software is installed on the computer system (214). Accordingly, the process of modifying a computer system with installation of one or more software applications includes a simulator to present the results of the simulation of the modification prior to actual modification of the system.

Figure 4:
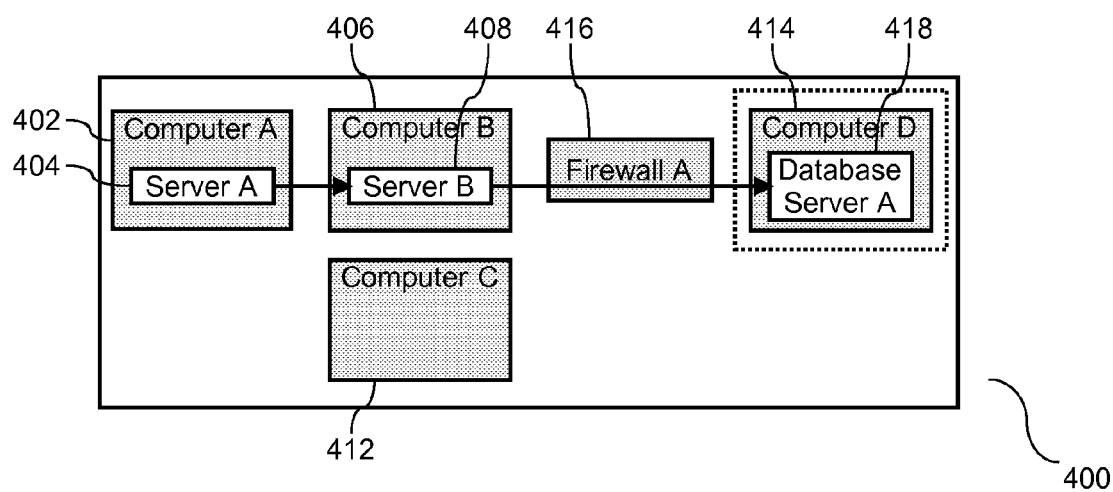
FIG. 4 is a block diagram of a sample topology model.

FIG. 3 is a flow chart (300) demonstrating a process for showing the installation and configuration of system candidates, as shown at step (206). A topology model of the system is created (302) by the topology model data management model (106). An example topology model is shown in FIG. 4. The installation and configuration candidates are then lined up for presentation (304). In one embodiment, the user presents a list of software installation candidates, or the system provides a list of suggested software installation candidates. With the creation of the topology map and the software applications suggested to be installed, a list of available resources on the system are organized (306), and presented to the user on a visual display (308). In one embodiment, the user is presented with a topology map of the existing system, and its components and configuration, together with a list of candidates available for simulation of an installation. Accordingly, the process of showing installation candidates is intended to facilitate a performance of a simulation of system changes in view of selection and projected installation of one or more of the software applications.

As noted above, the topology model data management model (106) creates a topology of the system components at step (302). FIG. 4 is a block diagram (400) of a sample topology model. As shown, there are four computers. The first computer, computer$_A$, (402), has a server, server$_A$, (404). The second computer, computer$_B$, (406), has a server, server$_B$, (408). The first computer (402) is shown in unilateral communication (410) with the second computer (406). Both the first and second computers (402) and (406), respectively, are in communication with a fourth computer, computer$_D$ (414) via a firewall (416). The fourth computer (414) maintains a database (418) therein for server$_A$ (404). In one embodiment, the data for the topology of the system is maintained by the CMDB. The firewall (416) is configured with a communication port to enable communication between computer$_B$ (406) and computer$_D$ (414). However, there is no communication port to enable computer$_C$ (412) to communication with computer$_D$ (414). In one embodiment, the system may include additional components or a different arrangement of components. The example shown herein is merely for illustrative purposes and should not be considered to further limit the invention. Accordingly, the topology shown herein is merely an example of the topology of the hardware components of a computer system for which a user may want to install one or more software applications.

Figure 5:
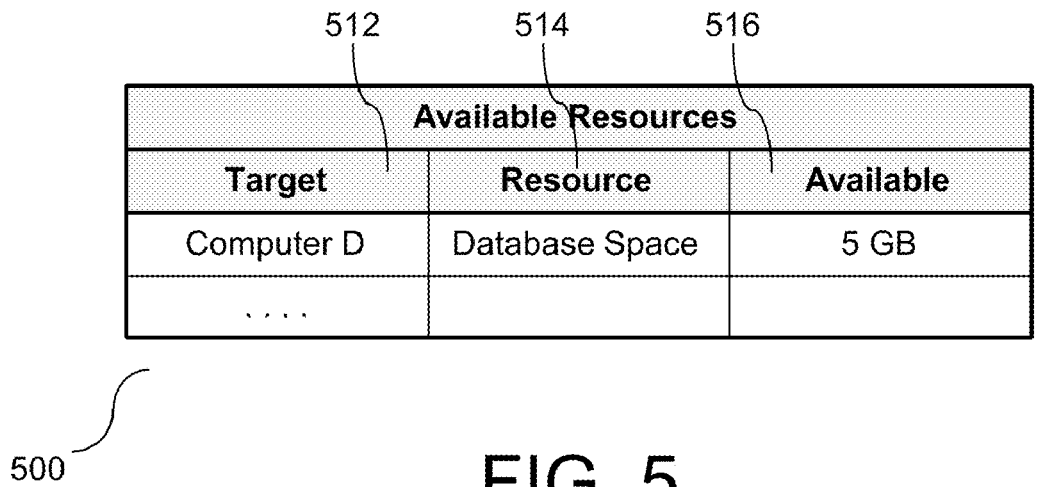
FIG. 5 is a block diagram of an example available resource list.

Part of the installation simulation includes evaluation of hardware components in the system to determine the capabilities of the components and whether or not the components can support the proposed installation. In one embodiment of the invention new distributed software needs to be installed together with additional hardware to support the software installation. Distributed software is a program that runs on more than one computer and communicates through a network. In one embodiment, some distributed software is actually two separate software programs including back end server software and front end client software. Back end software runs on a shared system and manager shared resources. In addition, the back end software also contains the main processing capability for an application. The front end software runs on workstations. It is the software that handles user interface functions, such as receiving input from an input device and displaying output to a visual display. Distributed applications can be relatively simple, requiring a single client computer and a single server, or more complex, allowing a plurality of client computers and server. For example, the proposed software installation may require a new server, such as a new web server, a new J2EE server, and/or a new database server. As shown at step (306) of FIG. 3, an available resource list is provided to demonstrate the capacity and capabilities of the hardware components in the system. FIG. 5 is a block diagram (500) of an example available resource list. As shown in this example, a table of available resources is provided. The list includes the target hardware subject to the proposed software installation (512), the resource provided by the target hardware (514), and the available capacity of the target hardware (516). In the example shown herein, the target hardware is the fourth computer, computer$_D$ (414) from the topology map of FIG. 4, which is shown as a database server. The example shown herein demonstrates that the available capacity (514) for this target is 5 gigabytes. Although only one resource is displayed herein, the invention should not be limited to display of a single resource in the available resource list. In one embodiment, more than one hardware resource may be affected by a software installation, wherein the list would include each of the target hardware resources in the system to be affected by the software installation and their associated capabilities and capacity.

Figure 6:
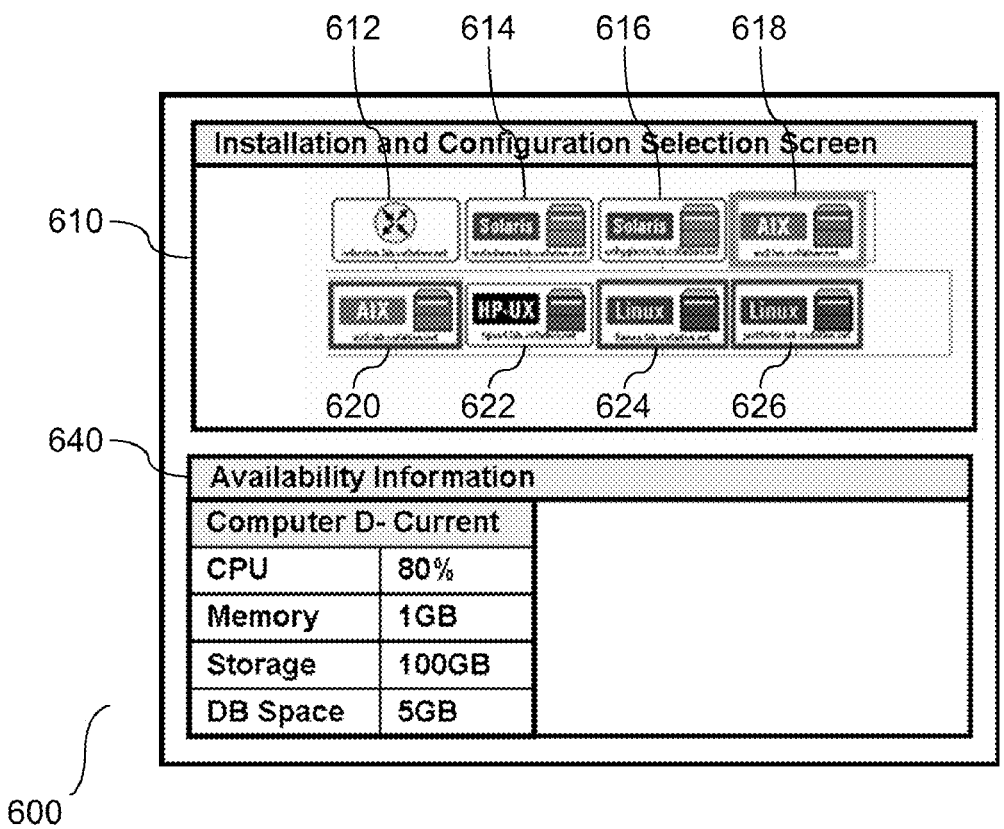
FIG. 6 is a block diagram showing an alternate resource list presentation.

FIG. 6 is a block diagram (600) showing an alternate resource list presentation. As shown herein the visual presentation is bifurcated with a first portion (610) showing hardware resources and target candidates to accept the proposed software installation among the hardware resources (512). In this example, there are a total of eight hardware resources (612), (614), (616), (618), (620), (622), (624), and (626). From the eight resources shown, four of the resources (618), (620), (624), and (626) are shown as candidates that include or potentially include the ability to support the software installation. A second portion of the visual presentation (640) shows availability information for a selected resource. In the example shown herein, target resource (618) is selected and the available bandwidth of the resources of these components is shown in the visual presentation at (640). As shown, the availability information includes the current operating usage of the components of the selected target resource. For example, it is shown in this example that the target hardware resource is operating at 80% capacity, and the current state of the memory, storage, and database space. This data facilitates a determination as to whether this selected target resource is optimal for the installation of a distributed software application. In one embodiment, as the user advances a pointing device over the different components shown in the first portion (610), i.e. highlights or selects the different components as target resources for proposed subject of a software application installation, the associated availability information is displayed in the second portion (640) of the display. Accordingly, the data on the visual display changes based upon specified components selected.

Figure 7:
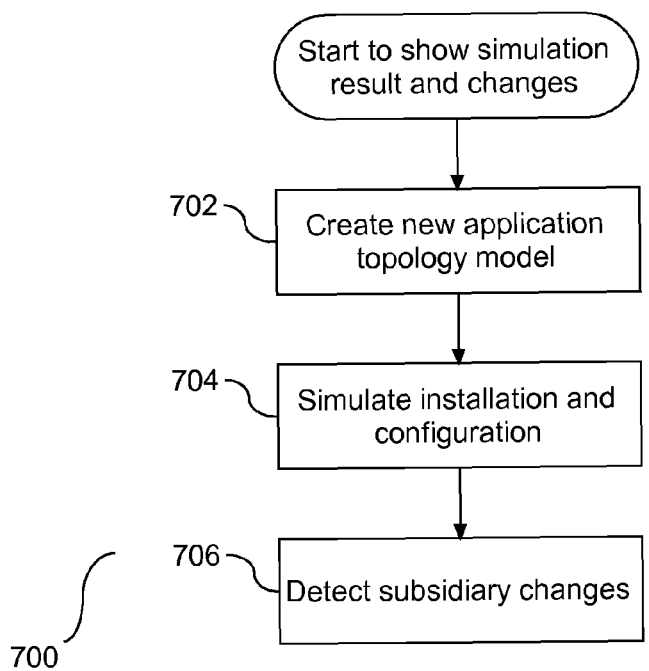
FIG. 7 is a flow chart illustrating the process of showing a proposed simulation to the user.

FIG. 7 is a flow chart (700) illustrating the process of showing a proposed simulation to the user, as identified at step (210) of FIG. 2. Following the process of selecting components for a simulated installation, a model of the topology of the hardware resources of the system is created (702). An example of the new application topology model is shown in detail in FIG. 8. The topology model simulates installation and configuration of one or more selected software applications (704). In addition, any required or suggested underlying changes to the existing system are detected (706). Examples of such changes may include a requirement for one or more additional communication ports, addition of database space, etc. For example, based on the example in FIG. 4, there may be a need to open a port between the firewall for communication of computer$_C$ (412) with computer$_D$ (414). Similarly, the database on computer$_D$ (414) may need to be expanded to accommodate the software installation. In one embodiment, other changes may be necessary, and those shown here are merely examples and should not be considered to further limit the invention.

Figure 8:
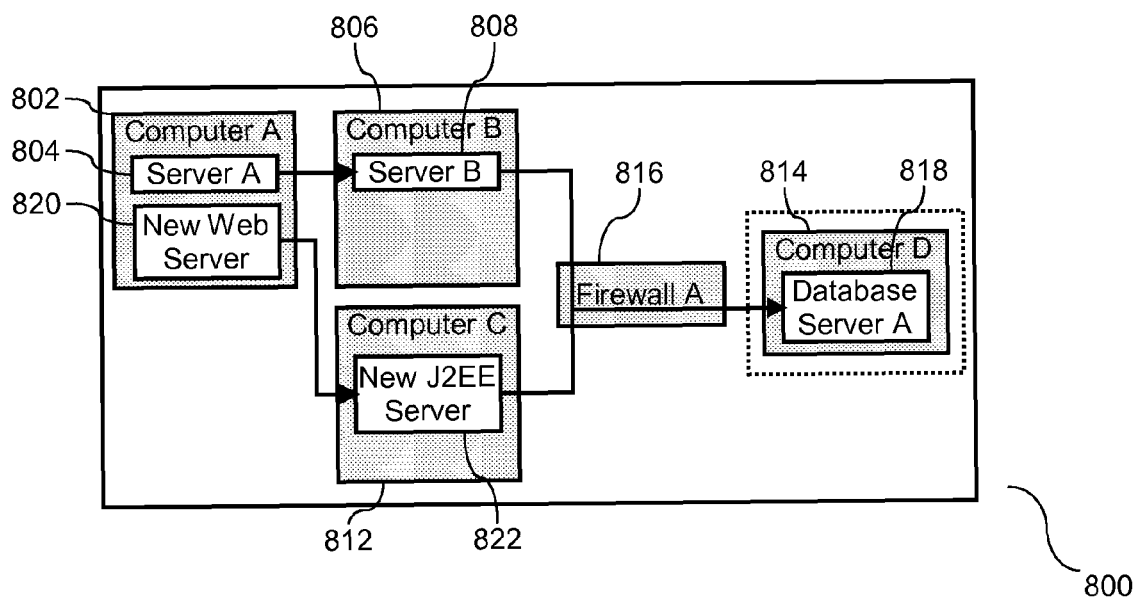
FIG. 8 is a block diagram of a visual display simulating the installation and configuration of a new software application.

As noted above, a simulation of a software application installation is conducted to determine if the installation is feasible and, if so, if the installation will require modification of the hardware components. Part of the simulation process includes creating a new hardware resource topology model based upon the components selected for installation. FIG. 8 is a block diagram (800) of a visual display simulation of the installation and configuration of a new software application by super-imposing the new topology model over the topology of the available and already installed hardware resources. The example shown herein is based upon the topology model of FIG. 4 and the components therein. As shown, there are three new hardware components to be added to the system to support the proposed software installation. The existing target components includes a first computer, computer$_A$, (802), has a server, server$_A$, (804). A second computer, computer$_B$, (806), has a server, server$_B$, (808). Both the first and second computers (802) and (806), respectively, are in communication with a fourth computer, computer$_D$ (814) via a firewall (816). The fourth computer (814) maintains a database (818) therein for server$_A$ (804). The firewall (816) is configured with a communication port to enable communication between computer$_B$ (806) and computer$_D$ (814). The new components to be added to support the software installation include a new web server (820) installed on computer$_A$, (802), a new J2EE (822) server installed on computer$_C$ (812). No components are shown to be added to computer$_B$ (806). However, a communication port is provided for the firewall (816) to enable communication of computer$_C$ (812) with computer$_D$ (814). Accordingly, as shown herein a new topology model demonstrates modification to the hardware resources is provided by the simulator to show the projected physical effects of the software installation on the hardware resources.

In addition to showing the simulated topology of the hardware resources as a result of the proposed software installation, the simulator also detects whether the system comprises the necessary hardware components to support the software installation and resulting hardware modification. The hardware components may currently have the capacity to handle the proposed software installation. However, this is not always the case and additional hardware may be required. The simulator evaluates the selection based upon the data in the product information database and the CMDB to determine hardware component modifications, if necessary. FIG. 9 is a block diagram (900) of an example chart showing the requested changes to the hardware configuration so that the hardware may support the software installation. As shown, there are three categories for the requested changes, including the target hardware resource (910), the item in the target hardware resource that requires the modification (920), and the required modification (930). The first target resource is identified as computer$_D$ (912), with required additional database space (922) and the amount of additional space required (932). The second target resource is identified as the firewall (914), with the required change to the resource identified (924) and the identification of the modification to the identified resource (934).

In one embodiment, the visual display of the simulated modification is divided into three sections. FIG. 10 is a block diagram (1000) showing an example of the visual display. The first section (1002) shows a topology of the physical components that exist in the system together with the components to be installed. The second section (1004) shows the changes to the system that are required to maintain operation of the existing system. In one embodiment, such changes may include a need for additional memory (1006), additional database space (1008), and an addition of a port to the existing firewall (1010). The third section (1020) compares the system utilization prior to the proposed modification to the system utilization after the proposed modification. For example, prior to any modifications computer$_D$ is shown to have the processor operating at 80% of capacity, with 1 gigabyte of memory in use, as well as 100 gigabytes of storage and 5 gigabytes of database space (1022). Based upon the simulation of the added components (1024), computer$_D$ is shown to have the processor operating at 50% capacity, with 800 megabyte of memory in use, as well as 80 gigabytes of storage space and 15 gigabytes of database space unused.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 11:
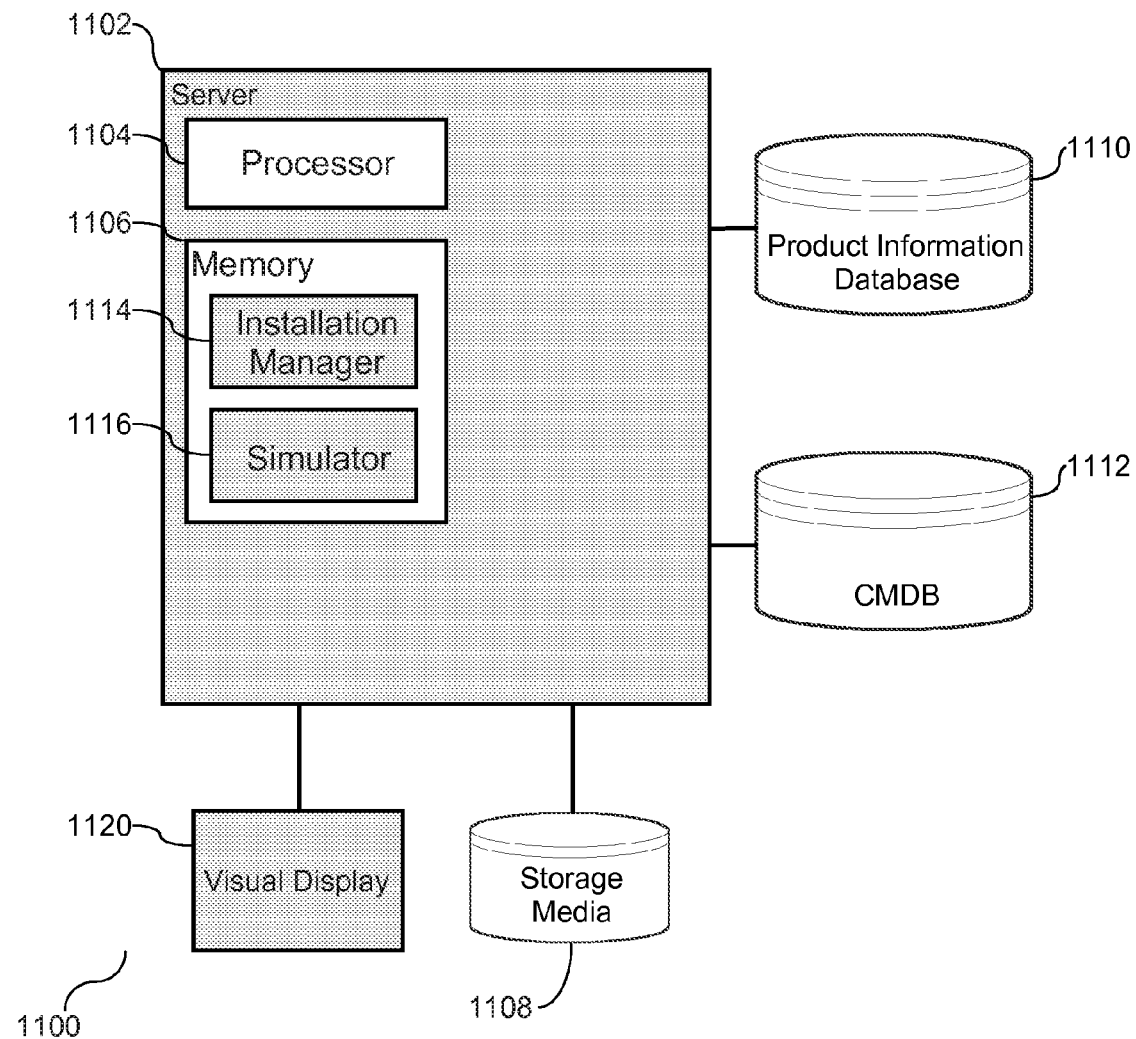
FIG. 11 is a block diagram of a computer system with a manager and simulator to implement simulation of a software installation.

FIG. 11 is a block diagram (1100) illustrating placement of the simulation tool in a computer system. The illustration shows a server (1102) with a processor (1104), and memory (1106) in communication with storage media (1108) and a visual display (1120). As shown in FIG. 1, the server (1102) is in communication with a product information database (1110) and a CMDB (1112). The databases (1110) and (1112) maintain the information necessary to facilitate the simulation of an application installation. A tool to request installation of a new software application and to search for configuration and correlation information in the form of an installation manager (1114) is shown residing in memory (1106) of the server (1102). The manager (1114) communicates with a simulator (1116), which is also shown residing in memory (1106), to facilitate virtual installation of a software application prior to actual installation. The simulated affects of the software installation may be presented to a user interface on the visual display (1120). The manager (1114) may utilize instructions in a computer readable medium to mediate the virtual installation of the software application(s) while the simulator (1116) may utilize instructions in a computer readable medium to facilitate the virtual installation of the software application(s). Similarly, in one embodiment, the manager (1114) and simulator (1116) may reside as hardware tools external to memory (1106), or they may be implemented as a combination of hardware and software. Accordingly, the manager (1114) and simulator (1116) may be implemented as a software tool or a hardware tool to facilitate simulation of an installation of a software application.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

A simulation of an installation of a distributed software application is provided, together with associated and projected hardware resource performance, to enable an assessment of the software installation prior to the actual installation. This simulation evaluates the current utilization of the hardware resources, the affect of the installation on the hardware resources, and whether additional hardware resources need to be added to support the software installation. Through the simulator and modeling techniques, recommendations are provided regarding installation of additional hardware resources based upon the topology of the existing hardware resources and compatibility of any additional hardware resources with the existing hardware resources. The simulation does not require the user to select the proposed modification. Upon reviewing a proposed modification, the user may select to accept the modification and install the software as well as view alternative software installations. Accordingly, the simulator functions as a tool to facilitate installation of a software application and to communication the implications of the installation as it pertains to the hardware resources required to support the software installation.

Alternative Embodiments

It will be appreciated that, although specific embodiments of the invention have been described herein for purposes of illustration, various modifications may be made without departing from the spirit and scope of the invention. In particular, in one embodiment, if the user is not comfortable with selecting the modification in one simulated configuration, the user may preview multiple installations and configurations to determine which one, if any, would be optimal. Accordingly, the scope of protection of this invention is limited only by the following claims and their equivalents.

We claim:

1. A method for simulating installation of distributed software comprising:
    requesting installation of a new software application in a computer system configured with a configuration management database (CMDB) to store hardware and software resource data;
    prior to installing said new software application, searching for configuration and correlation information for hardware and software stored in said CMDB responsive to said request and simulating affects of installation of said requested software application on said hardware and software resources in said computer system, including presenting resource candidates available for installation on a visual display, and applying said hardware and software resource data stored in said CMDB to said simulation by selecting one or more of said presented resource candidates; and
    presenting said simulated affects to a user interface, including displaying availability information on the display for the one or more selected resource candidates.

2. The method of claim 1, wherein the step of presenting said simulated affects of installation of said requested software includes delivering predicted results of said installation prior to installation of said new software application.

3. The method of claim 2, further comprising previewing required hardware changes to said computer system prior to installation of said new software application.

4. The method of claim 3, further comprising dynamically comparing installation and configuration data of a hardware resource prior to installation of said software application with said hardware resource after a simulated installation of said software application.

5. The method of claim 3, wherein the step of previewing said required hardware changes includes a graphical user interface for presenting a topology of the hardware resources in the system and a capacity of each of the resources to support the requested software installation.

6. The method of claim 5, further comprising interactively selecting resources on said graphical user interface and receiving resource data for said selected resource.

7. The method of claim 1, further comprising changing availability information on the display for the one or more selected resource candidates based upon selected components.

8. A computer system comprising:
    a processor in communication with storage media;
    said storage media having a configuration management database (CMDB) to store hardware and software resource data;
    an installation manager to request installation of a new software application in a computer system configured with said CMDB;
    said installation manager to search for configuration and correlation information for hardware and software stored in said CMDB in response to said request for installation of said new software and prior to installation of said new software application;
    a simulator to simulate affects of installation of said requested software application on associated hardware and software resources in said computer system prior to installation and running said requested application, including presentation of available resource candidates for installation on a visual display and application of said hardware and software resource data stored in said CMDB to said simulator by selection of one or more of said presented resource candidates; and
    a user interface to receive a presentation of said simulated affects.

9. The system of claim 8, wherein the simulator delivers predicted results of said installation prior to installation of said new software application.

10. The system of claim 9, further comprising a visual display on which said simulator presents said simulated affects of installation for preview, including required hardware changes to said computer system prior to installation of said new software application.

11. The system of claim 10, further comprising said simulator to provide a dynamic comparison of installation and configuration data of a hardware resource prior to installation of said software application with said hardware resource after a simulated installation of said software application.

12. The system of claim 10, further wherein the preview of said required hardware changes includes a graphical user interface to present a topology of the hardware resources in the system and an associated capacity of each of the resources to support the requested software installation.

13. The system of claim 12, further comprising a selection tool to support interactive selection of resources on said graphical user interface, and wherein resource data for said selected resource is received in response to movement of said selection tool to one of said resources displayed on said graphical user interface.

14. An article comprising:
a computer readable data storage medium including computer program instructions configured to simulate an installation of distributed software comprising:
instructions to request installation of a new software application in a computer system configured with a configuration management database (CMDB) to store hardware and software resource data;
instructions to search for configuration and correlation information for hardware and software stored in said CMDB responsive to said request and prior to installing said new software application;
instructions to simulate affects of installation of said requested software application on said hardware and software resources in said computer system prior to installing and running said requested application, including presentation of available resource candidates for installation and including instructions to apply said hardware and software resource data stored in said CMDB to said simulation by selecting one or more of said presented resource candidates; and
instructions to present said simulated affects to a user interface, said simulated affects including availability information for one or more of the selected resource candidates.

15. The article of claim 14, wherein the instructions to simulate affects of installation of said requested software includes instructions to deliver predicted results of said installation prior to installation of said new software application.

16. The article of claim 15, further comprising instructions to preview required hardware changes to said computer system prior to installation of said new software application.

17. The article of claim 16, further comprising instructions to dynamically compare installation and configuration data of a hardware resource prior to installation of said software application with said hardware resource after a simulated installation of said software application.

18. The article of claim 16, further wherein the instructions to preview said required hardware changes includes a graphical user interface to present a topology of the hardware resources in the system and a capacity of each of the resources to support the requested software installation.

19. The article of claim 18, further comprising instructions to interactively select a resource on said graphical user interface and to receive resource data for said selected resource.

\* \* \* \* \*